United States Patent [19]

Azuma et al.

[11] Patent Number: 4,861,620
[45] Date of Patent: Aug. 29, 1989

[54] METHOD OF LASER MARKING

[75] Inventors: Kenkoku Azuma; Masaaki Sakaki, both of Nagoya, Japan

[73] Assignee: Mitsubishi Denki Kabushiki Kaisha, Tokyo, Japan

[21] Appl. No.: 111,320

[22] Filed: Oct. 22, 1987

[30] Foreign Application Priority Data

Nov. 14, 1986 [JP] Japan .............................. 61-271273
Nov. 20, 1986 [JP] Japan .............................. 61-277406

[51] Int. Cl.$^4$ .......................... B05D 3/06; G01D 9/00
[52] U.S. Cl. ................................ 427/53.1; 346/1.1; 346/108; 430/945
[58] Field of Search ............... 427/53.1; 346/1.1, 108; 430/962, 348, 349, 363, 365, 945, 964

[56] References Cited

U.S. PATENT DOCUMENTS 3,761,942  9/1973  Lorenz et al. ............... 346/108 X
4,753,863  6/1988  Spanjer ........................ 430/945 X

FOREIGN PATENT DOCUMENTS 44750    1/1982   European Pat. Off. .
3311882  2/1985   Fed. Rep. of Germany .
155493   8/1985   Japan ............................ 430/945
1459799 12/1976   United Kingdom .

Primary Examiner—Michael Lusignan
Attorney, Agent, or Firm—Sughrue, Mion, Zinn, Macpeak & Seas

[57] ABSTRACT

A pigment layer is provided on a surface of an article on which a marking is to be formed and is irradiated with patterned laser light to change internal molecular structure of pigment to thereby change its color. The marking can be multicolored by a suitable selection of pigment and laser energy density.

4 Claims, 3 Drawing Sheets

METHOD OF LASER MARKING

BACKGROUND OF THE INVENTION

The present invention relates to a method of laser marking which is used to form on a surface of an article a sharp mark by means of laser beam at high speed.

In forming marks such as a symbol mark, configuration of product and manufacturing data of product, etc., on a surface of an article, it has been usual to use the so-called mask transfer technique by which a plurality of symbols and/or characters are transferred onto such surface simultaneously at high speed or to engrave the surface up to several microns by scanning a laser beam along symbols and/or character to be marked thereon.

Particularly, in the conventional marking method using a laser beam, a portion of the product on which the marking is to be performed by local laser-heating and evaporation of material of the product must be heated to a temperature at which such local evaporation takes place. The temperature depends upon the material of the product and it is about 500° C. when the material is of plastics and about 2000° C. when the material is ceramics.

Therefore, in order to achieve such high temperature of the local portion of the product, an output power of a laser must be large enough. However, when the product is, for example, an electronic component such as a semiconductor device, there is a strong possibility of thermal degradation thereof due to local heating by the laser beam and dust and/or smoke produced during the laser marking may contaminate the electronic component.

Since the marking is performed by the local evaporation and/or burning of the material, the smoothness of the surface of the product may be degraded and the sharpness of the mark formed thereon may become degraded sometimes.

SUMMARY OF THE INVENTION

An object of the present invention is to provide a method of laser marking by which a temperature rise of a product having a surface on which the marking is performed is restricted and a reduction of the required laser power is realized while the sharpness of the mark is acceptable.

Another object of the present invention is to provide a method of laser marking by which a mark to be provided is multicolored so that the mark itself can be easily identified.

According to the present invention, a surface of a product on which the laser marking is performed is coated with a layer of pigment whose color is changed when its temperature exceeds a predetermined value by painting a surface portion of the material or by mixing such pigment into the material of the product and the marking is performed by irradiating the surface with a laser beam along a path defining a desired mark so that the latter mark is provided as a portion of the surface whose color is changed.

Pigment to be used in this invention changes its color by a change of internal structure thereof at or higher than a predetermined temperature. Pigment may be selected from a group consisting of a Hg compound, cobalt compound, iron compound, copper compound, nickel compound, lead compound, vanadium compound and any mixture thereof.

DETAILED DESCRIPTION OF THE PREFERRED EMBODIMENTS

Figure 1:
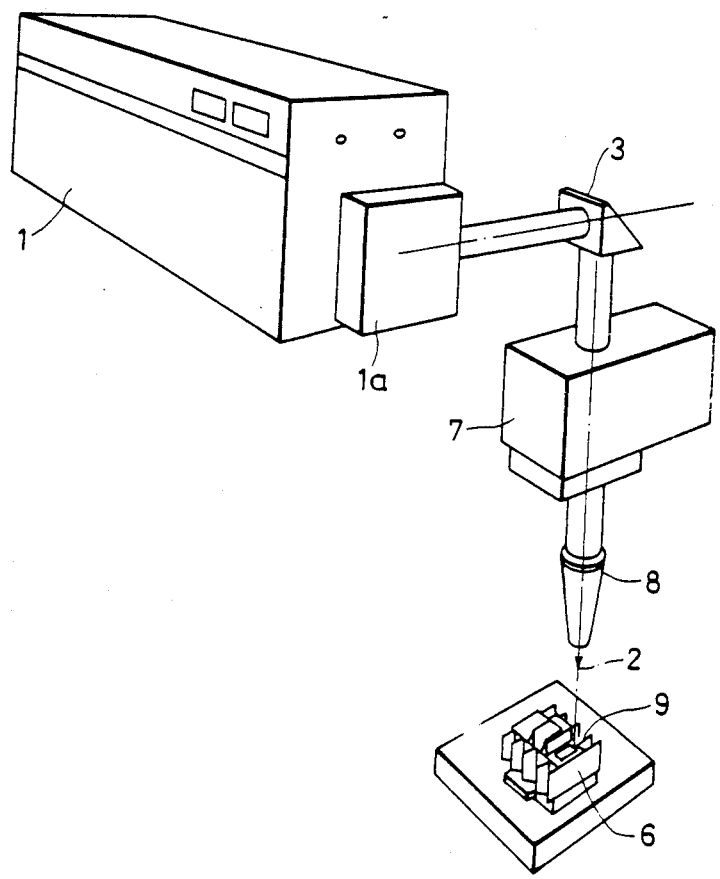
FIG. 1 is a perspective view of an apparatus for performing the present method.
Figure 2:
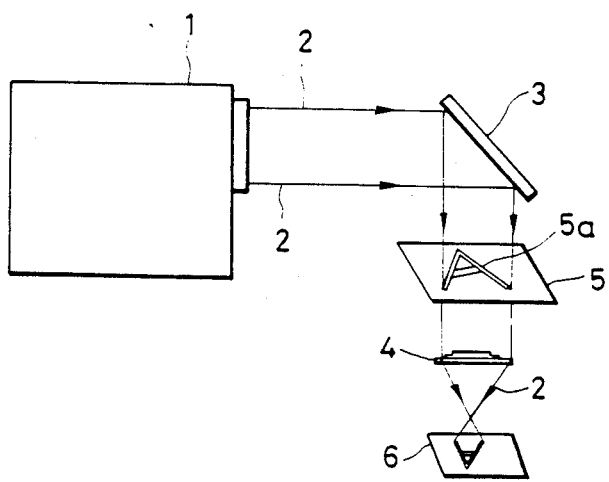
FIG. 2 illustrates an operation of the apparatus shown in FIG. 1.

In FIGS. 1 and 2, in which FIG. 1 is a perspective view of a TEACO2 laser marking apparatus suitable for the mask transfer technique and FIG. 2 illustrates an operation of the marking apparatus shown in FIG. 1, a reference numeral 1 depicts a laser oscillator for transmitting a marking laser beam 2. The laser beam 2 is directed to a reflection mirror 3 from which it is directed to a condenser lens 4. The beams condensed by the condenser lens 4 is passed through a mask 5 having a marking pattern 5a to a surface of a product 6 on which the marking pattern 5a, in this illustration, a letter A, is formed.

A shutter 1a is provided in a laser path between the laser oscillator 1 and the reflection mirror 3 and the mask 5 is housed in a mask holder 7. The condenser lens 4 is housed in a condenser portion 8. The product 6 to be marked is shown in this figure as an electro-magnetic switch and a portion thereof on which the mark is to be provided is shown by a reference numeral 9.

Describing the present method in more detail, the marking portion 9 of the source of the product 6 is preliminarily coated with a layer of pigment whose color is changed by its internal structure at or higher than a predetermined temperature. The coating can be acievied by painting the portion with the pigment. Alternatively, it may be possible to mix the pigment into the material of the product and thereafter to mold the latter. The latter method may be useful when the product is of plastic material.

Then, the positional relation between the laser oscillator 1, the reflection mirror 3, the mask plate 5, the condenser lens 4 and the product 6 is regulated such that the surface of the product 6 on the side of the condenser lens 4 is faced to the mask plate 5. Then, the surface portion 9 of the product 6 is irradiated with the laser beam 2 from the laser oscillator 1 through the mask plate 5 having the marking pattern 5a and the condenser lens 4. With this irradiation, pigment in the portion irradiated with the laser beam is heated thereby to the predetermined temperature or higher immediately and changes its internal structure and hence its color, resulting in a mark having a different color from its background color.

As to an irreversible or semi-irreversible change of internal structure and hence color of the pigment due to a temperature increase by the laser irradiation, there are two types, one being pigment whose molecules such as $H_2O$ and $CO_2$ etc. are discharged therefrom by the heating at or higher than the predetermined temperature so that it is thermally decomposed to change the molecular structure permanently to thereby provide a different color from its original color and the other being pigment whose crystalline structure and hence color is changed by such as glass transition due to the increased temperature.

A classification of pigments used in embodiments are given in Table 1 and temperatures at which the pigments in Table 1 change their colors and the colors changes are given in Table 2. In Table 2, other temperatures and color changes than typical are also given for reference. It should be noted that the embodiments numbered 6 to 20 are color changes due to thermal decomposition.

TABLE 1

| Embodiments | | classification of pigments |
|---|---|---|
| No. | 1 | Hg (inorg.) compound |
| | 2 | |
| | 3 | |
| | 4 | |
| | 5 | |
| | 6 | cobalt compound (e.g., cobalt oxalate including water of crystallization, cobalt formate including water of crystallization, cobalt phosphate including water of crystallization) |
| | 7 | potassium cobalticnitride |
| | 8 | copper compound |
| | 9 | cobalt compound |
| | 10 | cobalt compound |
| | 11 | bismuth oxalate |
| | 12 | copper oxalate |
| | 13 | cobalt compound |
| | 14 | cobalt oxalate |
| | 15 | nickel oxalate + cobalt oxalate |
| | 16 | nickel compound |
| | 17 | lead compound |
| | 18 | |
| | 19 | |
| | 20 | |

TABLE 2

| Embodiments | | original color | color change temp. | new color | note | |
|---|---|---|---|---|---|---|
| No. | 1 | light pink | 50° C. | light blue | | semi-irreversible |
| | 2 | light pink | 70 | light blue tinted violet | | semi-irreversible |
| | 3 | light pink | 80 | light violet | | semi-irreversible |
| | 4 | light pink | 90 | light violet | | semi-irreversible |
| | 5 | light green | 110 | light blue tinted violet | yellow tinted gray at about 70° C. | semi-irreversible |
| | 6 | light purple red | 130 | blue violet | | irreversible |
| | 7 | blue tinted green | 140 | light violet | | irreversible |
| | 8 | light green tinted blue | 160 | gray black | | irreversible |
| | 9 | purple red | 180 | brown black | | irreversible |
| | 10 | light yellow orange | 200 | light blue tinted violet | | irreversible |
| | 11 | white | 220 | gray black | light pink at about 180° C. | irreversible |
| | 12 | light green tinted blue | 250 | red brown tinted gray | brown black at about 270° C. | irreversible |

TABLE 2-continued

| Embodiments | | original color | color change temp. | new color | note | |
|---|---|---|---|---|---|---|
| | 13 | light yellow orange | 270 | light blue violet | | irreversible |
| | 14 | light pink | 290 | black | light brown at about 170° C. | irreversible |
| | 15 | light blue tinted gray | 310 | brown black | | irreversible |
| | 16 | light blue green | 330 | gray black | | irreversible |
| | 17 | white | 360 | orange | gray white at about 290° C. | irreversible |
| | 18 | blue | 410 | brown white | | irreversible |
| | 19 | white | 440 | light yellow brown | blue tinted white at about 210° C. blue tinted black at about 310° C. | irreversible |
| | 20 | violet | 450 | white | | irreversible |

The inventors have conducted various experiments on each of the embodiments listed in Tables 1 and 2 and those conducted on the embodiment No. 6 will be described in detail as an example.

In the experiments conducted on the embodiment No. 6, the pigment used was a paint containing powder of $Co_3(PO_4)\ 8H_2O$, particle size being 2 $\mu$m or smaller, and having the following constituents:

| | |
|---|---|
| $CO_3(PO_4)8H_2O$ | 30 wt % |
| tarc | 4 wt % |
| ethylcellose lacquer | 33 wt % |
| (resin component | 15 wt %) |
| thinner | 33 wt % |

A surface of a phenol resin plate of 5 mm thick which was used as an example of the product was sprayed with the above mentioned paint to form a pigment layer of about 30 $\mu$m thick thereon. The phenol resin plate having the pigment layer was dried at room temperature for about 24 hours. The resultant product was irradiated with a short pulse laser beam of pulse width of 1 $\mu$m or narrower from the TEACO$_2$ laser oscillator 1 shown in FIG. 1 and color changes of portions of the surface thereof were observed. When the energy density of the laser beam at the pigment layer was 1.0 Joule/cm$^2$, the original pink color of the pigment layer was changed to a blue color uniformly and 16 numerals of alternate gothic type each being 1.2 mm tall (at transfer time) punched in a copper plate mask disposed in the mask holding portion 7 were sharply transferred onto the pigment layer. When the energy density of the laser beam was 0.6 Joule/cm$^2$ or smaller, there were incomplete local color changes produced in each numeral and a reading of the transferred numerals became difficult. It is believed that the observed color change is due to the phenomenon that a portion of eight water molecules in cobalt phosphate is made free by the laser irradiation and it is changed to another cobalt phosphate including an unknown amount of water which exhibits blue color and is expressed by ($Co_3(PO_4)_2 \cdot XH_2O$ ($1<X<7$)), according to the following reaction:

$$Co_3(PO_4)_2 \cdot 8H_2O \text{ (pink)} \xrightarrow{\text{laser irradiation}} Co_3(PO_4)_2 \cdot XH_2O \text{ (blue)} + (8-X)H_2O$$

The assumption of the range of X is due to the fact that cobalt phosphate having no water of crystallization exhibits red color.

For a comparison purpose, identical phenol resin plates to the plate used in the above experiments and having no pigment coating were irradiated with laser beams from the same apparatus as that used in the above experiments, with the laser energy density being varied to find the critical laser energy density necessary to clearly read out the numerals transferred onto the pigment layer. According to the latter experiments, the critical energy density was 4 Joule/cm² and it was possible to read out the numerals clearly when the energy density was more than the critical value at which the numerals transferred onto the black pigment layer were exhibited by gray white and which were not clear with respect to the black background.

Other embodiments which employ iron compounds as the pigments and which are not shown in Table 1 are represented by the following reaction formula:

$$\alpha\text{-FeOOH(yellow)} \xrightarrow[200°\text{ C.}]{\text{laser irradiation}} \alpha\text{-Fe}_2O_3 \text{ (red)}$$

$$\gamma\text{-Fe}_2O_3 \text{ (brown)} \xrightarrow[530°\text{ C.}]{\text{laser irradiation}} \alpha\text{-Fe}_2O_3 \text{ (red)}$$

As mentioned hereinbefore, the laser marking method according to the present invention utilizes the change in internal structure of the pigment by a temperature increase thereof due to laser beam irradiation. Therefore, there are no problems of dust and/or smoke which are undesirable for the product to be marked and the mark itself is formed without engraving on the product surface. The contrast of the mark with respect to the background can be made very high.

Depending upon the kind of pigment, it is possible to restrict the temperature at which the color change occurs to a relatively low value, e.g., 70° C. and therefore the present marking can be performed even for the product which is thermally unstable. Further, as mentioned previously, the laser power to be used in this invention can be remarkably reduced compared with the conventional method which uses the local evaporation or burning of material forming the product.

Figure 3:
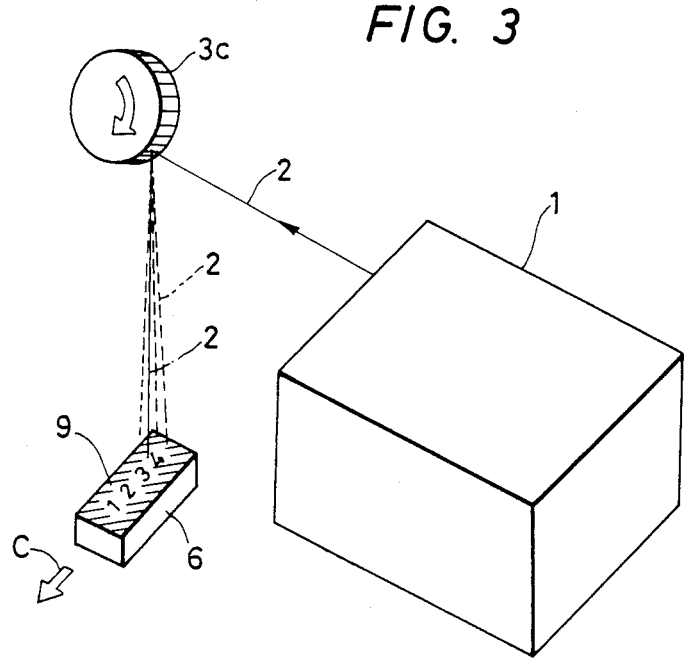
FIG. 3 is a perspective view of another apparatus for performing the present method.
Figure 4:
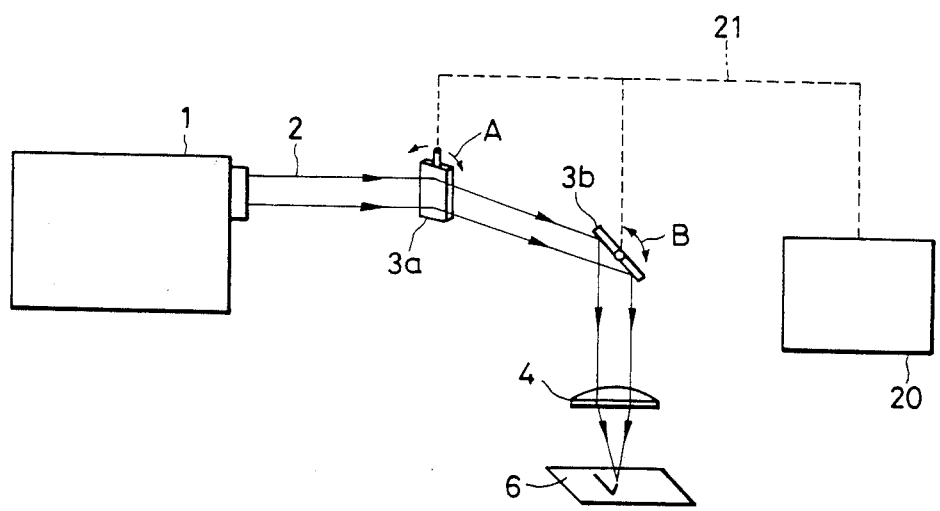
FIG. 4 is a further apparatus for performing the present method.

FIG. 3 is a perspective view of a laser marking apparatus of a laser dot impact marking type which is composed of a combination of a pulse laser and a polygonal mirror and FIG. 4 shows a modification of the apparatus in FIG. 3, in which the the polygonal mirrors is replaced by a pair of scanning mirror 3a swingeable in a direction A and a scanning mirror B swingable in a direction B are provided and are program-controlled by control signals 21 from a controller 20.

In FIG. 3, the polygonal mirror 3c is rotated while the product 6 to be marked is moved in a direction C so that the product 6 is scanned in a direction orthogonal to the direction C.

With the apparatus shown in FIGS. 3 and 4, the present method can be effectively performed. While the TEACO2 laser is described herein as the source of the laser beam, other lasers, such as an Nd:YAG laser, can be also used for this invention with the same effect.

In another experiment, pigment having the following constituents was used, with which a plate which is identical to the phenol plate used in the previously mentioned experiment was spray-coated to a thickness of about 30 μm and, after being dried at room temperature for about 24 hours, the plate was subjected to laser irradiation in the same way as in the previous experiment:

ammonium metavanadate($NH_4VO_3$): 25 wt%
tarc: 4 wt%
ethylcellose lacquer: 33 wt%
(resin component: 15 wt%)
thinner: 38 wt%

It was observed that, when energy density of a short pulse laser, pulse width being 1 μm or narrower, from the TEACO2 laser 1 is from 1.1 Joule to 1.8 Joule/cm², the original color, white, was changed to brown uniformly and 16 alternate gothic numerals punched in the copper mask 5 were clearly transferred. When laser energy density was 0.8 Joule/cm² or smaller, transferred numerals were locally faded causing the reading thereof to be difficult. It is believed that the color change is realized due to the phenomenon that water molecules and ammonia molecules are discharged from ammonium metavanadate according to the following reaction, resulting in vanadium pentoxide:

$$2NH_4VO_3 \text{ (white)} \xrightarrow{\text{laser irradiation}} V_2O_5 \text{ (brown)} + H_2O + 2NH_3$$

With the laser energy density increased from 1.8 Joule/cm² to 5.0 Joule/cm², the original white color was changed to black uniformly. Thus it is possible to provide a multi-colored marking by selecting pigment and laser energy density suitably.

Another experiment was conducted by using nickel chloride hexamethylene-tetramine ($NiCl_2 \cdot 2C_6H_{12}N_4 \cdot 10H_2O$) as pigment with the following composition:

nickel chloride hexamethylene-tetramine: 25 wt%
tarc: 5 wt%
ethylcellose lacquer: 40 wt%
thinner: 30 wt%

An aluminum plate was coated with a layer of pigment, about 30 μm thick, and, after being dried under the same conditions as those used in the previous experiment, a portion thereof was irradiated for 1.5 m sec. with CO2 gas laser energy density of 250 W/cm². With this laser irradiation, the original color, green, was changed to yellow green. Another portion of the pigment layer was irradiated for 3.0 m sec. with a laser energy density of 250 W/cm². The color of the latter portion was changed from its original green color to light blue violet. It is believed that this color change is due to discharge of water of crystallization as shown in the following reactions:

$$NiCl_2 \cdot 2C_6H_{12}N_4 \cdot 10H_2O \text{ (green)} \xrightarrow{\text{laser irradiation(1.5 msec.)}} NiCl_2 \cdot 2C_6H_{12}N_4 \cdot 2H_2O \text{ (yellow green)} + 8H_2O$$

-continued $$NiCl_2 \cdot 2C_6H_{12}N_4 \cdot 10H_2O \text{ (green)} \xrightarrow{\text{laser irradiation(3.0 msec)}} NiCl_2 \cdot 2C_6H_{12}N_4 + 10 H_2O$$

Thus it is possible to provide a multi-colored marking.

As mentioned herein before, it is possible, according to the present invention, to provide a mono-colored or multi-colored marking by a suitable selection of pigment and laser energy density.

What is claimed is:

1. A method of marking an article surface comprising the steps of coating the article surface with pigment or mixing the pigment into the material of the article, wherein said pigment is capable of changing its original color to another color at or higher than a predetermined temperature, and irradiating portions of the pigment coating with a marking laser light, whereby the irradiated portions are marked by the another color, wherein said pigment is a combination of a plurality of different pigments providing different colors at different temperatures, respectively, and said marking laser is a mixture of a corresponding number of laser beams having different energy densities necessary to heat said article surface to said different temperatures, respectively, whereby said irradiated portions of said article surface are marked with said different colors.

2. The method as claimed in claim 1, wherein said pigment contains material capable of changing its original color to another color by a change of its internal molecular structure caused by heat given by said laser light.

3. The method as claimed in claim 2, wherein said pigment is selected from a group consisting of Hg compound, cobalt compound, potassium cobaltienitride, copper compound, nickel compound, lead compound, iron compound, vanadium compound and any mixture thereof.

4. The method as claimed in claim 1, wherein said portions of said pigment layer are irradiated with laser light of different energy density, respectively.

* * * * *